US012360516B2

(12) United States Patent
Stark et al.

(10) Patent No.: US 12,360,516 B2
(45) Date of Patent: Jul. 15, 2025

(54) GENERATING CONTROL CODE FOR AN INDUSTRIAL PLANT

(71) Applicant: ABB Schweiz AG, Baden (CH)

(72) Inventors: Katharina Stark, Weinheim (DE);
Mario Hoernicke, Landau (DE);
Nicolai Schoch, Heidelberg (DE)

(73) Assignee: ABB Schweiz AG, Baden (CH)

( * ) Notice: Subject to any disclaimer, the term of this patent is extended or adjusted under 35 U.S.C. 154(b) by 277 days.

(21) Appl. No.: 17/867,909

(22) Filed: Jul. 19, 2022

(65) Prior Publication Data

US 2023/0019073 A1 Jan. 19, 2023

(30) Foreign Application Priority Data

Jul. 19, 2021 (EP) .................................... 21186488

(51) Int. Cl.
*G05B 19/418* (2006.01)

(52) U.S. Cl.
CPC ... *G05B 19/41865* (2013.01); *G05B 19/4188* (2013.01)

(58) Field of Classification Search
CPC ...... G05B 19/4188; G05B 23/02; G05B 9/02; G05B 19/042; G05B 9/50; G05B 23/0286; G05B 19/0421
USPC ........................................................ 700/100
See application file for complete search history.

(56) References Cited

U.S. PATENT DOCUMENTS

| 6,369,836 | B1 * | 4/2002 | Larson ...................... G06F 8/34 715/965 |
| 6,448,982 | B1 * | 9/2002 | Klapper ............. G05B 19/4189 715/764 |
| 6,898,468 | B2 * | 5/2005 | Ott .......................... G05B 9/02 714/37 |
| 6,941,261 | B1 * | 9/2005 | Quinn .................. G05B 19/056 715/764 |
| 9,367,064 | B2 * | 6/2016 | Gohr ........................ G05B 9/02 |
| 9,411,333 | B2 * | 8/2016 | Gohr .................... G05B 23/027 |
| 10,809,690 | B2 * | 10/2020 | Law ...................... G05B 19/056 |
| 2002/0194218 | A1 | 12/2002 | Klapper et al. |
| 2002/0198907 | A1 | 12/2002 | Klapper et al. |

(Continued)

FOREIGN PATENT DOCUMENTS

CN 102959480 A 3/2013
CN 103097973 A 5/2013
(Continued)

OTHER PUBLICATIONS

Bernshausen et al., "Namur Module Type Package—Definition," *atp edition*, 58 (1-2): 72-81 (Jan. 1, 2016).

(Continued)

*Primary Examiner* — Ronald D Hartman, Jr.
(74) *Attorney, Agent, or Firm* — Leydig, Voit & Mayer, Ltd.

(57) ABSTRACT

A method of generating control code for an industrial plant comprises: defining control logic for controlling the industrial plant by editing a cause-and-effect matrix provided by an engineering tool, wherein the defining comprises defining both instrument-based control logic and service-based control logic using the same cause-and-effect matrix; and generating the control code for controlling the industrial plant on the basis of the defined control logic.

5 Claims, 6 Drawing Sheets

(56) References Cited

U.S. PATENT DOCUMENTS

| | | | | |
|---|---|---|---|---|
| 2013/0131843 A1* | 5/2013 | Gohr | ............... | G05B 19/0421 700/80 |
| 2016/0139570 A1* | 5/2016 | Skipp | ............... | G05B 9/02 700/79 |
| 2018/0300048 A1* | 10/2018 | Law | ............... | G06F 3/0482 |

FOREIGN PATENT DOCUMENTS

| | | |
|---|---|---|
| CN | 108139724 A | 6/2018 |
| CN | 112513756 A | 3/2021 |
| CN | 112534365 A | 3/2021 |
| EP | 3608736 A1 | 2/2020 |
| EP | 3608741 A1 | 2/2020 |
| WO | WO 2016/103229 A1 | 6/2016 |

OTHER PUBLICATIONS

Bloch et al., "Analysis of service-oriented architecture approaches suitable for modular process automation," *IEEE 21st International Conference on Emerging Technologies and Factory Automation (ETFA)*, pp. 1-8 (Sep. 6-9, 2016).

Bloch et al., "Orchestration of Services in Modular Process Plants," *IECON 2018—44th Annual Conference of the IEEE Industrial Electronics Society*, pp. 1-6 (Oct. 21-23, 2018).

Hoernicke et al., "Modular Process Plants: Part 2—Plant Orchestration and Pilot Application," *ABB Review*, 03(2019): 30-35 (Aug. 2019).

Namur, "Automation Requirements relating to Modularisation of Process Plants," NE 148, 32 pp. (Oct. 22, 2013).

Verein Deutscher Ingenieure E.V., "Automation engineering of modular systems in the process industry—General concept and interfaces," VDI/VDE/NAMUR 2658 Blatt 1, 36 pp., (Oct. 2019).

Verein Deutscher Ingenieure E.V., "Automation engineering of modular systems in the process industry—Modelling of human-machine-interfaces," VDI/VDE/NAMUR 2658 Blatt 2, 32 pp., (Nov. 2019).

European Patent Office, Extended European Search Report in European Patent Application No. 21186488.9, 15 pp. (Feb. 8, 2022).

European Patent Office, Partial European Search Report in European Patent Application No. 21186488.9, 16 pp. (Jan. 17, 2022).

* cited by examiner

GENERATING CONTROL CODE FOR AN INDUSTRIAL PLANT

CROSS-REFERENCE TO RELATED APPLICATIONS

This patent application claims priority to European Patent Application No. 21186488.9, filed on Jul. 19, 2021, which is incorporated herein in its entirety by this reference.

FIELD OF THE DISCLOSURE

The present disclosure relates to methods and systems for generating control code for an industrial plant and for controlling the industrial plant using the generated control code.

BACKGROUND OF THE INVENTION

Modular plants are an established aspect of Industry 4.0 and provide benefits not only with respect to development cost but also with respect to time and material efforts. An integral layer of the modular plant structure consists of prefabricated and well-tested modules called PEAs (Process Equipment Assembly), that can readily be assembled in different combinations to realize different target systems. Data exchange between PEAs is realized via a standardized interface description called Modular Type Package (MTP). Under the MTP approach, a service-oriented architecture is used whereby modules expose their inner functions to the orchestration system as services. The MTP approach creates the framework for interoperability between modules and the orchestration system, enabling process plants to be built up and engineered in a modular way, with the goal of simplifying process plant engineering and life cycle management.

Nonetheless, there sometimes exists a need to design and engineer plants that contain both modular and non-modular ('monolithic') parts, which are referred to herein as 'partly modular plants'. Difficulties can arise when attempting to orchestrate modules that expose their functions as services alongside other units that do not provide services.

BRIEF SUMMARY OF THE INVENTION

To better address one or more of these concerns, in a first aspect there is provided a method of generating control code for an industrial plant. The method comprises: defining control logic for controlling the industrial plant by editing a cause-and-effect matrix provided by an engineering tool, wherein the defining comprises defining both instrument-based control logic and service-based control logic using the same cause-and-effect matrix; and generating the control code for controlling the industrial plant on the basis of the defined control logic.

The terms "service-based" and "instrument-based" as used herein may be understood in terms of the encapsulation of the equipment used by the modules of modular plants, which expose their functionality as services that are accessible using a well-defined interface, in comparison to the non-encapsulated nature of non-modular plant equipment, which is directly accessible without any intervening interface. "Services" may be understood within the context of MTP but may be referred to as functions in other contexts. Stated differently, service-based logic relates to the indirect control of plant equipment via the services exposed by the modules, whereas instrument-based logic relates to the direct control of plant equipment. In the case of service-based logic, output signals may instruct the services provided by the modules to change service state, indirectly leading to changes in equipment state, whereas output signals in the case of instrument-based logic may directly instruct plant equipment to change its equipment state, e.g., actuator state. Plant equipment is not directly controllable using service-based logic, whereas the reverse is true for instrument-based logic. Instrument-based logic may also be referred to as equipment-based logic.

By displaying the service state logic of modules alongside normal or traditional (instrument-based) logic in the cause-and-effect matrix, the engineer is provided with an intuitive, single-view tool for combining the normal process logic with the control of services in a more graphical way than using structured text. In other words, the user is allowed to combine the logic configuration via services with the logic configuration via instruments in a single tool or view. This may be of particular use for partly-modular plants and brownfield plants when adding one or more modules.

The method of the first aspect may further comprise specifying a recipe for a process to be performed by the industrial plant, the recipe comprising at least one step associated with an action and at least one transition condition for transitioning to a subsequent step, wherein editing the cause-and-effect matrix to define the control logic comprises using the cause-and-effect matrix to define logic for the action, logic for the transition condition, or both.

According to a second aspect, there is provided a method of generating control code for an industrial plant. The method comprises: specifying a recipe for a process to be performed by the industrial plant, the recipe comprising at least one step associated with an action and at least one transition condition for transitioning to a subsequent step; editing a cause-and-effect matrix provided by an engineering tool to define control logic for the industrial plant, comprising using the cause-and-effect matrix to define logic for the action, logic for the transition condition, or both; and generating the control code for controlling the industrial plant on the basis of the defined control logic.

Thus, by enabling the user to enter the logic for the steps and transitions in the recipe using the cause-and-effect matrix, an intuitive and user-friendly interface is provided to allow people other than automation engineers to create the recipe and enter the logic. Furthermore, the recipe may be created in this way for industrial plants which are modular, non-modular, or partly modular.

In the method of the second aspect, the step of defining the control logic may comprise defining both instrument-based control logic and service-based control logic using the same cause-and-effect matrix.

In one example of the method of the first or second aspect, the instrument-based logic relates to the operation of a non-modular part of the industrial plant and the service-based logic relates to the operation of a modular part of the industrial plant, such that a single cause-and-effect matrix can be used to define some or all of the control logic for a partly-modular plant, combining traditional process logic with the orchestration of the services used in modules. In another example, the instrument-based logic relates to the operation of a first module of the industrial plant and the service-based logic relates to the operation of a second module which is nested within the first module, such that the single cause-and-effect matrix facilitates the nesting of modules and the orchestration of nested modules within a modular or partly modular plant.

In the method of the first or second aspect, the cause-and-effect matrix may comprise an extended cause-andeffect matrix which enables the definition of both safety logic and process control logic. The extended cause-and-effect matrix (which may be referred to as an xCE) provides a compact and easy-to-use engineering format whose usage saves engineering time while mitigating errors and misunderstandings as it can be understood by a variety of users. The xCE is described for example in "Technik-Kommunikation leicht gemacht: Cause-and-Effect-Diagramm als Lösungsansatz", by Katharina Gohr et al, atp edition, Jan. 2, 2014.

In the method of the first or second aspect, the recipe for the process may be specified using a sequential function chart or other type of flowchart.

The control code may be generated automatically once the control logic is defined. Procedures for generating control code from control logic are known in the art.

According to a third aspect, there is provided a method of controlling an industrial plant, the method comprising: generating control code for the industrial plant using the method of the first or second aspect; and controlling the industrial plant using the generated control code.

According to a fourth aspect, there is provided a computing device comprising a processor configured to perform the method of any of the first-third aspects.

According to a fifth aspect, there is provided a computer program product comprising instructions which, when executed by a computing device, enable or cause the computing device to perform the method of any of the first-third aspects.

According to a sixth aspect, there is provided a computer-readable medium comprising instructions which, when executed by a computing device, enable or cause the computing device to perform the method of any of the first-third aspects.

In a variant to any of the aspects described herein, a function block diagram (FBD) may be used instead of, or in addition to, the cause-and-effect matrix. The function block diagram and the cause-and-effect matrix taken individually or in combination may be described more generally as process control logic definition means.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

BRIEF DESCRIPTION OF THE SEVERAL VIEWS OF THE DRAWING(S)

A detailed description will now be given, by way of example only, with reference to the accompanying drawings.

DETAILED DESCRIPTION OF THE INVENTION

Figure 1:
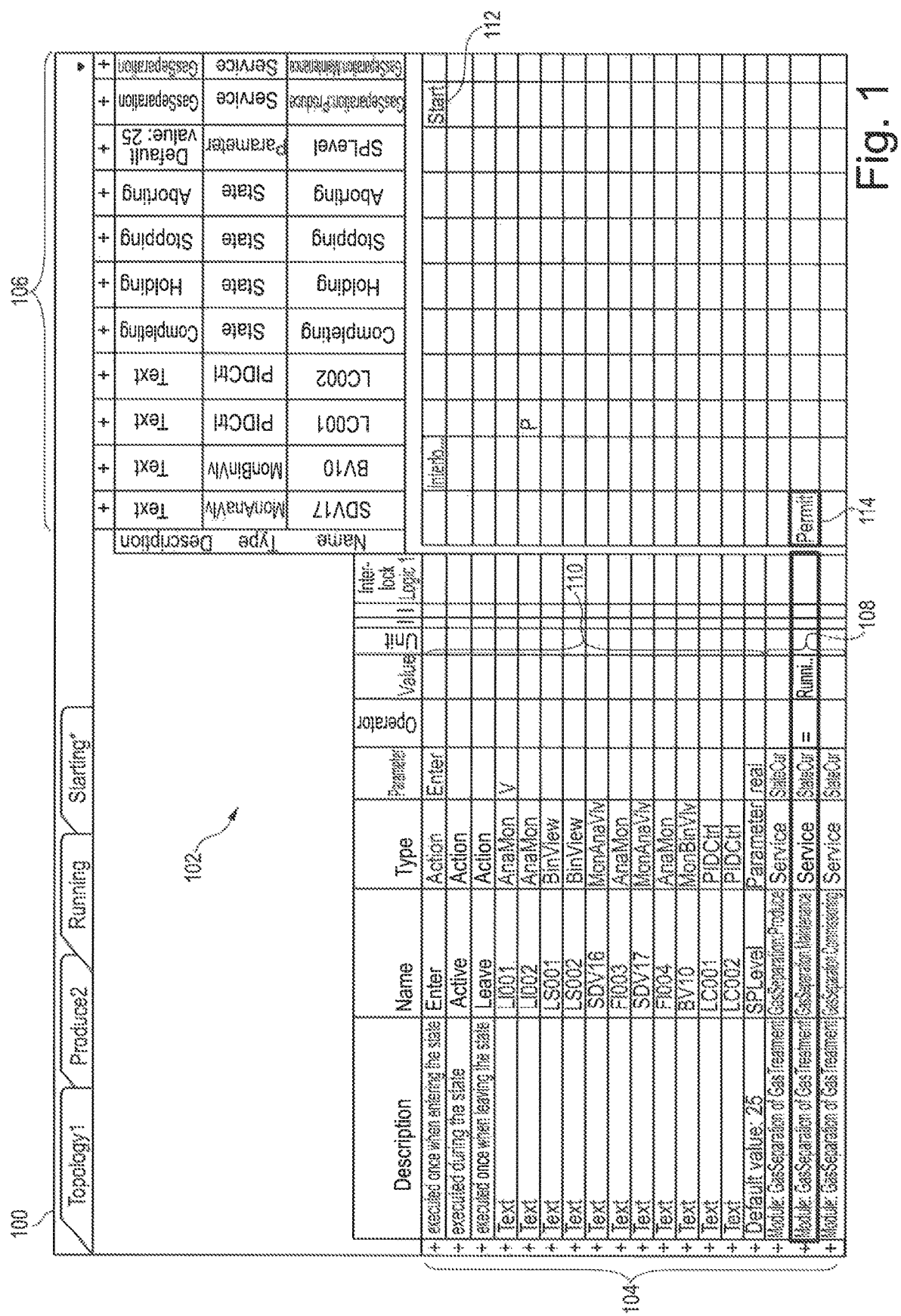
FIG. 1 shows a cause-and-effect matrix editor of an engineering tool being used to edit a cause-and-effect matrix, in accordance with the disclosure.

FIG. 1 shows a cause-and-effect matrix editor 100 of an engineering tool being used to edit a cause-and-effect matrix 102. The cause-and-effect matrix 102 comprises causes 104 arranged in horizontal rows and effects 106 arranged in vertical columns. The causes 104 comprise both service-based causes 108 and instrument-based causes 110. The service-based causes 108 reflect module services and allow the state or mode of the service to be checked (as a kind of feedback). The instrument-based causes 110 correspond to input devices such as sensor devices, e.g. a level sensor, which provide input signals, or to feedback from output devices such as valves (e.g. feedback valve open/closed). That is, instrument-based causes 110 are typically related to an instrument or a process variable or parameter. Similarly, at least some of the effects 106 are instrument-based effects corresponding to output devices, i.e. plant equipment such as actuators and motors providing actions, while other effects 106 are service-based. During an engineering phase, control logic configuration is carried out by editing the matrix 102 using the editor 100 so as to form connections between causes 104 and effects 106. This has the result of input signals, such as that from the level sensor, being connected in software to output signals, such as those to be transmitted to the actuator or motor. When the control logic has been configured in this way, the engineering tool then converts program logic components for the relevant causes 104 and program logic components for the relevant effects 106 into IEC61311-3 control code. The program logic components may comprise standardized portions of control code stored in a library in the form of function blocks, control modules, or similar. Finally, the IEC61311-3 control code, which is a form of intermediate code, is compiled into executable computer code and downloaded into the memory of at least one controller of the industrial plant. A suitable cause-and-effect editor may be provided by engineering tools such as the Control Builder M product or Advant Safety Builder product supplied by ABB, for example.

It will be apparent from FIG. 1 that the same cause-and-effect matrix 102 can be used to define both service-based logic and instrument-based logic. In particular, FIG. 1 shows at 112 the definition of control logic for starting (using the command "Start") a service (named "GasSeparation:Produce") within a module, while at 114, FIG. 1 shows the definition of logic for directly controlling the instrument SDV17 using the command "Permit". An entry in the matrix like "Start" or "Permit" triggers some action. The possible actions (e.g., listed in a drop-down menu in that crossing section) are dependent on the type of effect (e.g., for a valve, open/close, or, for a service, a service command). Also inputs could be selected, e.g. the setpoint of a PID-controller.

Enabling the editing of service-based logic in combination with instrumentation-based logic using a single editor in this way not only facilitates the definition of control logic for partly modular plants but also facilitates the nesting of modules within other modules.

Figure 2:
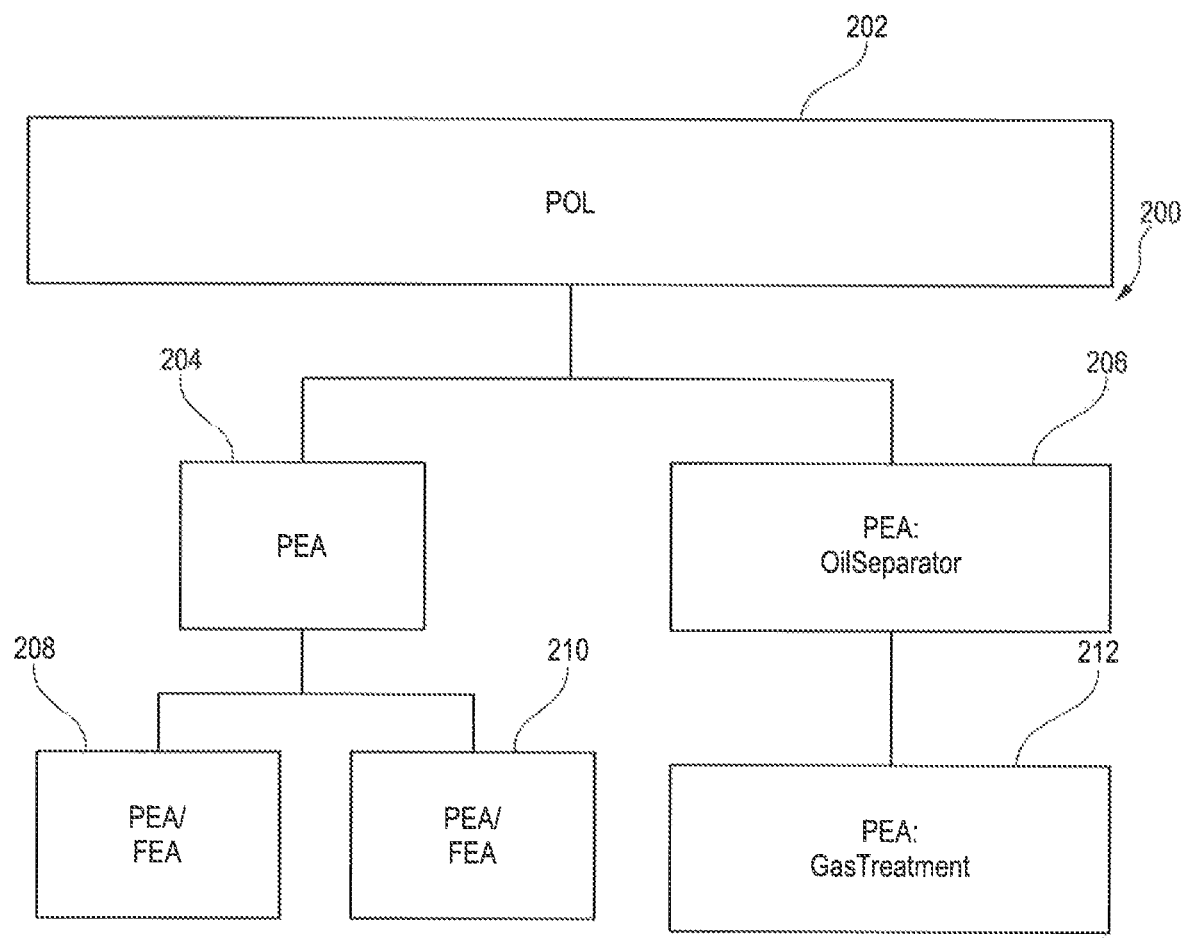
FIG. 2 illustrates the nesting of modules within a modular plant, in accordance with the disclosure.

FIG. 2 illustrates the nesting of modules within a modular plant 200. The upper layer comprises the process orchestration layer 202. The middle layer comprises modules 204, 206 in which modules 208, 210, 212 of the lower layer are nested. This nesting requires the modules in the middle layer to control both the instruments that are part of those modules as well as the services provided by the modules in the lower layer. The instruments in the modules in the lower layer are not directly controllable by the modules in the middle layer as they are encapsulated by those modules and can be accessed only via services. The modules in the middle layer now combine the functionality of the POL 202—the orchestration of services from modules in lower layers—with the functionality of a module—providing services to the upper layer. While the POL 202 orchestrates the modules underneath it with commands to the services for each step, this is different for the middle layer.

FIG. 2 further illustrates a particular example in which the module (PEA) 'OilSeparator' 206 has the module 'GasTreatment' 212 nested within it, with the 'GasTreatment' module 212 in the lower layer exposing the services 'Produce', 'Maintenance' and 'Commissioning' to the 'OilSeperator' module 206 in the middle layer. Using the cause-and-effect matrix 102, these services can be accessed and controlled from within the 'OilSeparator' module 206, while the instrumentation of the 'OilSeperator' module 206 can also be controlled. Thus, in contrast to the orchestration logic designed for the POL 202, the logic defined for this middle layer module 206 combines service-based or orchestration logic for the module 212 in the lower layer as well as instrumentation logic for directly controlling the instrumentation of the middle-layer module 206.

The cause-and-effect matrix 102 thus represents a convenient diagram for providing an overview of the entire logic for the module 206, and provides a new way of carrying out automation engineering, enabling the easy and efficient combination of traditional, instrument-based control logic with service-based control logic. This is an easy to understand format, even for non-automation engineers, well-suited to the handling of the two different control code variants.

In further examples, the nesting can extend to further layers so that even particularly large plants can make use of the concept. In addition, the concept can be extended to apply not only to physical modules which have their own controllers but also to so-called function modules which do not have their own controller but which make use of a central controller or which share a controller with other function modules.

The cause-and-effect matrix editor 100 can furthermore be used to define logic for actions and/or transition conditions when specifying a recipe for a process to be performed by the industrial plant, which in this case may be modular, non-modular, or partly modular, with the concept being valid for automation engineering in general. For example, the recipe may be specified using a sequential function chart (SFC), as is known in the art, which comprises steps with associated actions, transitions with associated logic conditions, and directed links between steps and transitions. The cause-and-effect matrix editor 100 may be used to configure logic for entering a step, actions during the step (i.e. when the step is active), and exiting the step.

Figure 3:
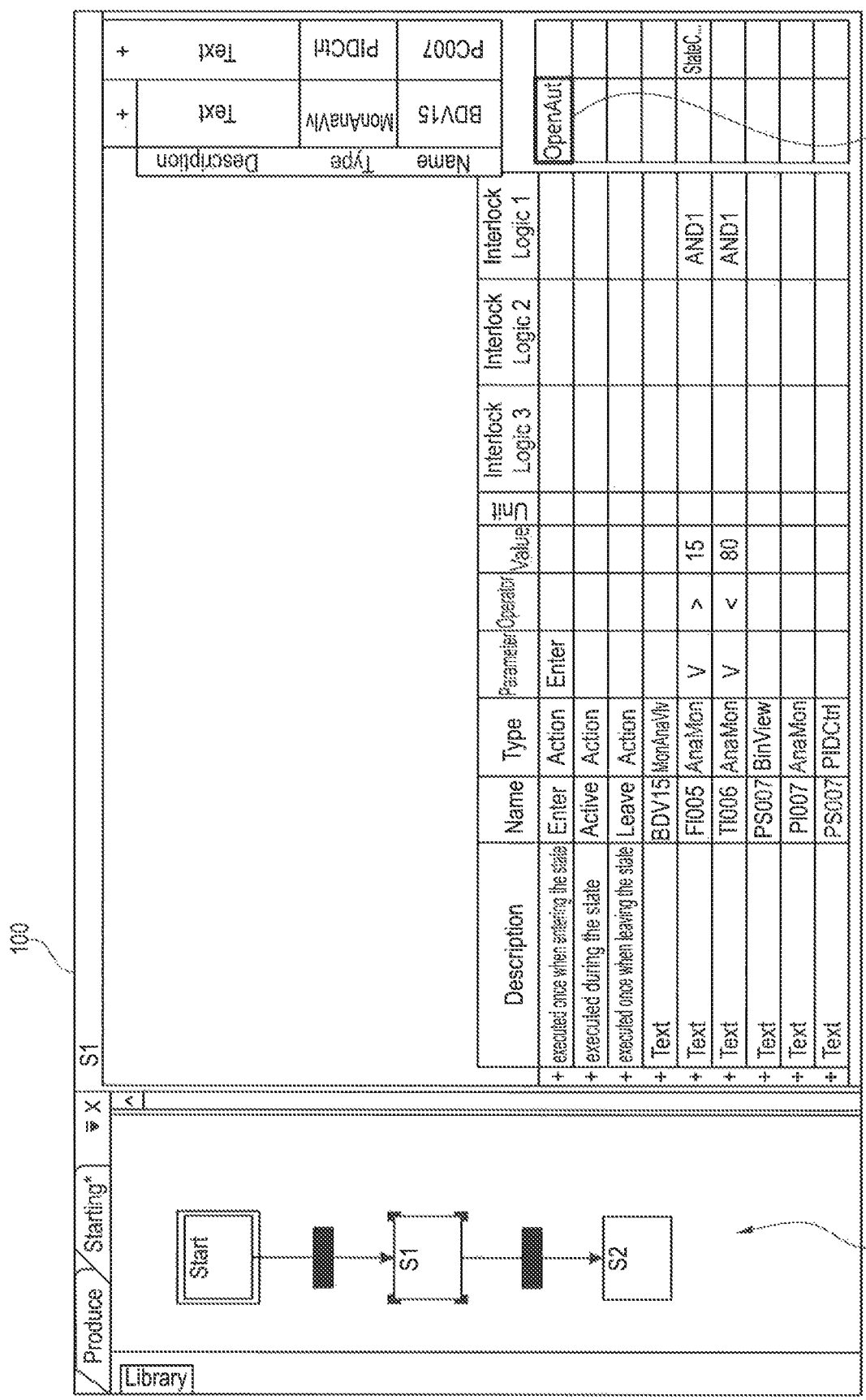
FIG. 3 illustrates the cause-and-effect matrix editor of FIG. 1 being used to specify action logic for a sequential function chart.
Figure 4:
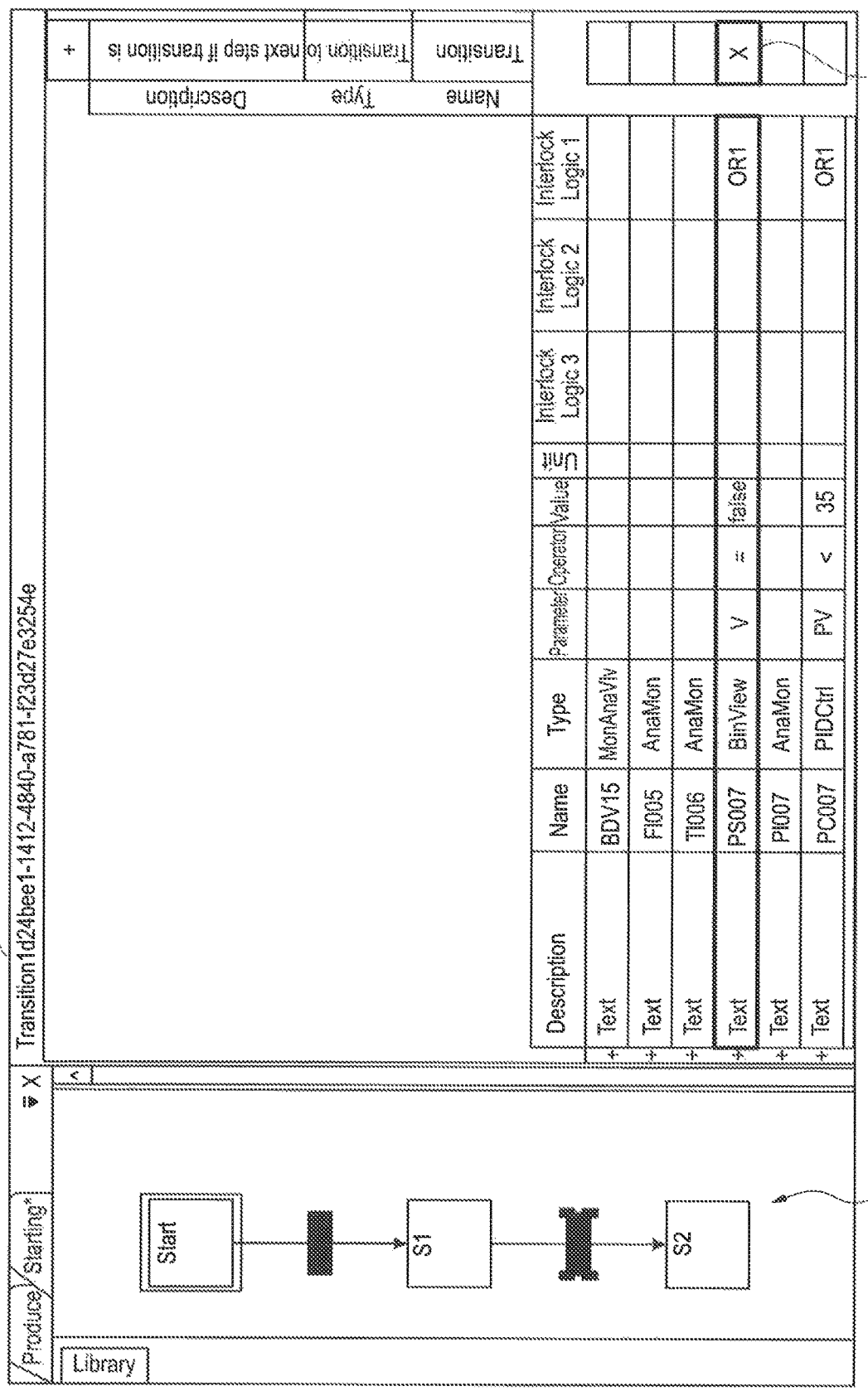
FIG. 4 illustrates the cause-and-effect matrix editor of FIG. 1 being used to specify transition logic for a sequential function chart.

FIGS. 3 and 4 illustrate the configuration of an SFC 350 that describes a recipe. FIG. 3 illustrates at 300 the cause-and-effect matrix editor 100 being used to specify action logic for entering step S1 of the SFC 350 representing the process recipe. In the non-limiting example shown, the valve BDV15 is instructed to open upon entry to the step S1. So here some action could be triggered either when the step S1 is executed or in addition depending on other inputs (causes). FIG. 4 illustrates at 400 the cause-and-effect matrix editor 100 being used to specify transition logic defining the condition for transitioning from step S1 to step S2 of the SFC 350. When the transition condition becomes true, the current step S1 is exited and the following step is executed. One or more causes can be combined and evaluated to check when and if the transition condition becomes true. In the non-limiting example shown, a transition is made from step S1 to step S2 in response to the parameter V of the instrument PS007 becoming false or the parameter PV of the instrument PC 007 falling under 35.

Figure 5:
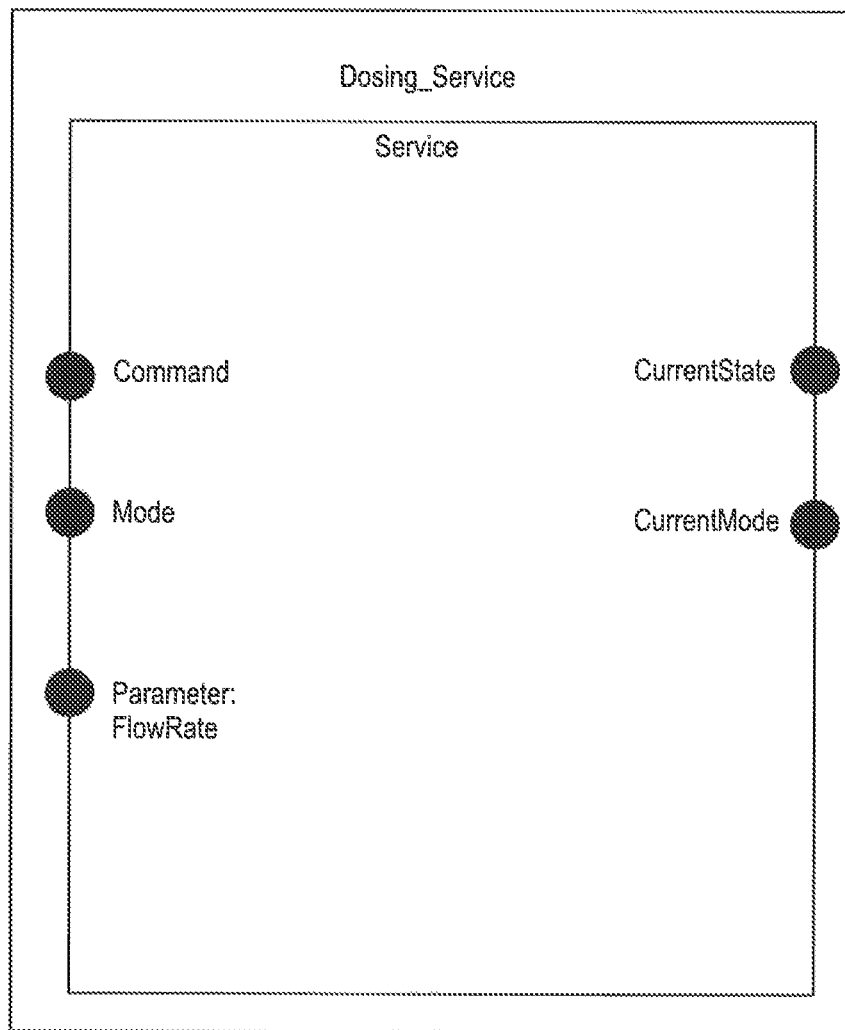
FIG. 5 illustrates a function block diagram for use in conjunction with the systems and methods described herein in accordance with the disclosure.

In a variant to the systems and methods described above, a function block diagram (FBD) replaces the cause-and-effect matrix. The standard-compatible FBD language can be adapted for use with services by introducing a special function block that provides a service-based interface. The service could be controlled through an FBD with the help of a function block (FB), as shown in FIG. 5, that encapsulates the service. In addition to the standard inputs and outputs that every service could have (like a command or the current state), the FB has service parameters that are specific to the service, e.g. a parameter "FlowRate" for a dosing service. Also, a service-FB could have process inputs and process outputs according to the MTP-standard.

Figure 6:
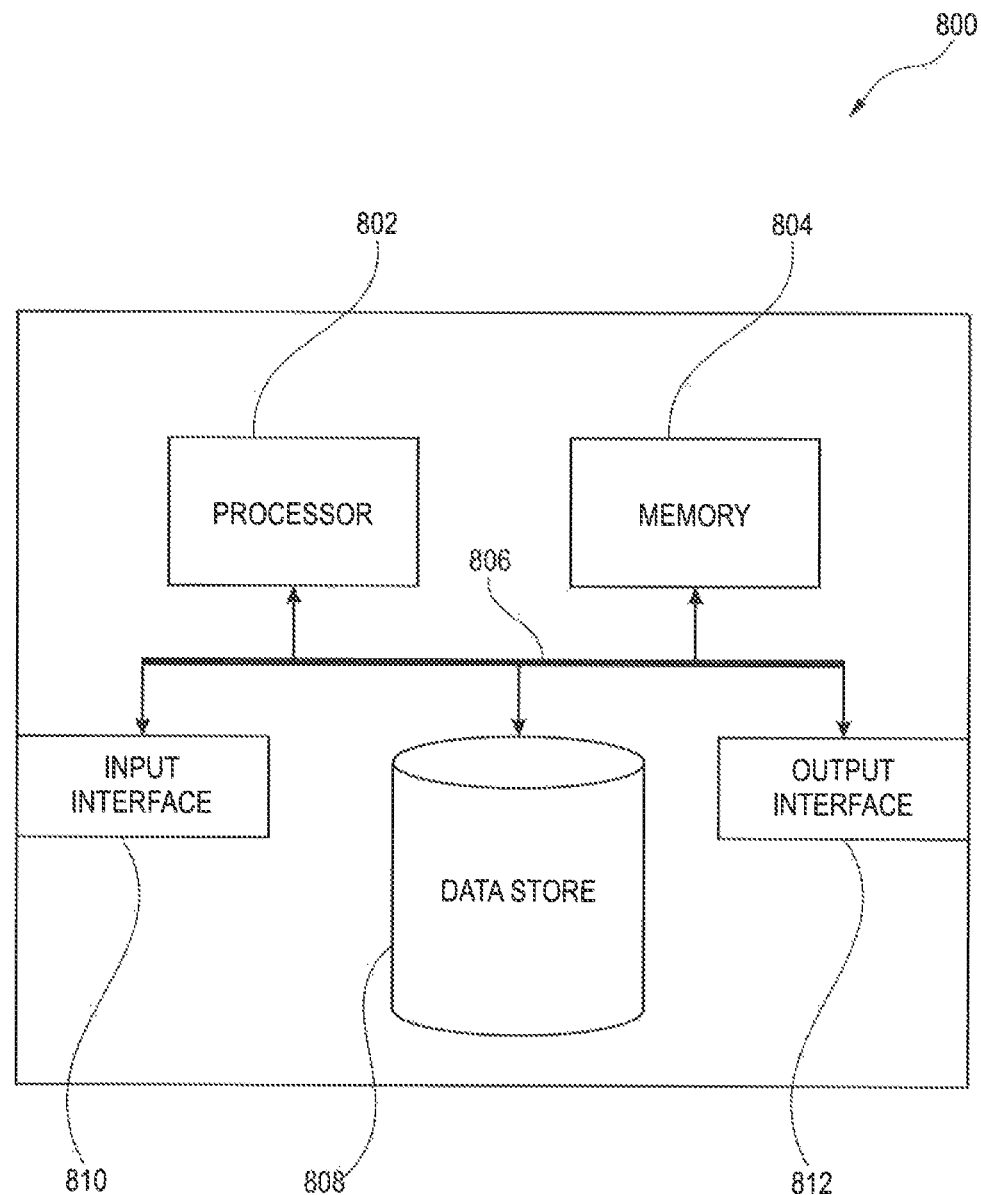
FIG. 6 illustrates a computing device that can be used in accordance with the systems and methods disclosed herein.

Referring now to FIG. 6, a high-level illustration of an exemplary computing device 800 that can be used in accordance with the systems and methodologies disclosed herein is illustrated. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word "comprising" does not exclude other elements or steps.

The indefinite article "a" or "an" does not exclude a plurality. In addition, the articles "a" and "an" as used herein should generally be construed to mean "one or more" unless specified otherwise or clear from the context to be directed to a singular form.

A single processor or other unit may fulfil the functions of several items recited in the claims.

The mere fact that certain measures are recited in mutually different dependent claims does not indicate that a combination of these measures cannot be used advantageously.

A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "X comprises A and/or B" is satisfied by any of the following instances: X comprises A; X comprises B; or X comprises both A and B.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of generating control code for an industrial plant, the method comprising:

defining control logic for controlling the industrial plant by editing a cause-and-effect matrix provided by an engineering tool, wherein the defining comprises defining both instrument-based control logic and service-based control logic using the same cause-and-effect matrix, wherein the instrument-based control logic relates to the operation of a first module of the industrial plant and the service-based control logic relates to the operation of a second module which is nested within the first module; and generating the control code for controlling the industrial plant on the basis of the defined control logic.

2. The method of claim 1, wherein the instrument-based control logic further relates to the operation of a non-modular part of the industrial plant and the service-based control logic further relates to the operation of a modular part of the industrial plant.

3. The method of claim 1, wherein the cause-and-effect matrix comprises an extended cause-and-effect matrix which enables the definition of both safety logic and process logic.

4. The method of claim 1, further comprising specifying a recipe for a process to be performed by the industrial plant, the recipe comprising at least one step associated with an action and at least one transition condition for transitioning to a subsequent step, wherein editing the cause-and-effect matrix to define the control logic comprises using the cause-and-effect matrix to define logic for the action, logic for the transition condition, or both.

5. The method of claim 4, further comprising specifying the recipe for the process using a sequential function chart.

* * * * *